United States Patent
Nesson et al.

[15] 3,657,980
[45] Apr. 25, 1972

[54] FLASHLAMP ROTATING AND FIRING APPARATUS

[72] Inventors: Israel Nesson, Fair Lawn; Robert G. Palmer, Wayne; Sam Zausner, Mahwah, all of N.J.

[73] Assignee: Keystone Division of Berkey Photo, Paramus, N.J.

[22] Filed: Sept. 2, 1970

[21] Appl. No.: 68,869

[52] U.S. Cl. ..........................95/11.5 R, 240/1.3, 240/37.1
[51] Int. Cl. ..........................................................G03b 15/04
[58] Field of Search..............95/11, 11 L, 11.5; 240/1.3, 240/37.1, 37

[56] References Cited

UNITED STATES PATENTS

| | | | |
|---|---|---|---|
| 3,544,249 | 12/1970 | Michatek | 95/11.5 R |
| 3,544,250 | 12/1970 | Beach | 95/11.5 R |
| 3,528,353 | 9/1970 | Colville | 95/11.5 R |
| 3,363,526 | 1/1968 | Ernisse | 95/11.5 R |

*Primary Examiner*—Samuel S. Matthews
*Assistant Examiner*—Robert P. Greiner
*Attorney*—Ralph R. Roberts

[57] ABSTRACT

A photographic camera mechanism includes a rotatable socket adapted to receive and removably retain a percussive multiflashlamp unit identified as a four lamp flashcube. The mechanism, to cause an exposure to be made, first causes the socket to be rotated between established limits and during this rotation the percussive primer mechanism of one lamp of the flashcube is caused to be positioned so that one end of a firing lever as it is moved by the shutter actuating mechanism strikes the primer to ignite the flashlamp. The firing lever causes the primer to be fired with the resulting ignition of the flashlamp being made in synchronism providing light for the scene in front of the camera as the shutter is swung to an exposure position. Detent or engaging means is provided by the socket and camera mechanism to insure that the flashlamp is not accidentally rotated to cause an igniting of a flashlamp except and during the time the camera mechanism is actuated for the taking of a picture.

16 Claims, 19 Drawing Figures

PATENTED APR 25 1972

INVENTOR.
ISRAEL NESSON
ROBERT G. PALMER
SAM ZAUSNER
BY Ralph R. Roberts
AGENT

INVENTOR.
ISRAEL NESSON
ROBERT G. PALMER
SAM ZAUSNER

BY Ralph R Roberts
AGENT

INVENTOR.
ISRAEL NESSON
ROBERT G. PALMER
SAM ZAUSNER
BY Ralph R Roberts
AGENT.

3,657,980

FLASHLAMP ROTATING AND FIRING APPARATUS

CROSS REFERENCE TO RELATED APPLICATIONS

This application relates to socket rotating and shutter actuating mechanism as shown and described in U.S. Pat. application, Ser. No. 827,650, filed on May 26th, 1969, and now U.S. Pat. No. 3,585,914 with Sukeyuki Oki as the inventor. Where the components and operation of said mechanism is identical or substantially identical to the instant invention, said application, Ser. No. 827,650 is incorporated into this application by reference.

BACKGROUND OF THE INVENTION

1. Field of the Invention

With reference to the classification of art as established by the United States Patent Office this invention pertains to the class of "Photography," and to the subclass thereunder of "cameras" and to the further subclass of "with illumination synchronism." Another pertinent field of art is the class of "Optics, Systems and Elements," and the subclass therein of "light beam deflection by displacing or rotating reflecting or transmitting element of mechanism."

2. Description of the Prior Art

The development and acceptance of a disposable multi-lamp photoflash unit or package for use with still cameras has resulted in many still cameras being made with an incorporated socket and mechanism for removably receiving and automatically indexing a photoflash package. Prior to the invention of the percussive photographic flashlamp unit as disclosed in U.S. Pat. No. 3,508,478 to Brooks of Apr. 28th, 1970, the indexing mechanism of these cameras contemplated the placing of a fresh or unfired lamp in an electronic firing circuit and, on the occasion of the actuation of the shutter mechanism, the circuit was closed by switch means to cause the photoflash lamp to be fired. This multi-lamp photoflash package usually had four lamps and was commonly identified as a "flashcube."

It No. also known to fire the lamp and, after ignition of the lamp has been initiated, to rotate the bulb so as to distribute the flash of light. Such a flash system is shown in U.S. Pat. No. 3,363,526 issued Jan. 16th, 1968, to P. J. Ernisse. In this patent the flashcube or package is disposed at a predetermined first position which is preferably at 15° to 30° previous to a line parallel to the lens axis of the camera. The firing of the lamp as well as the rotation of the flashlamp package while mounted in the socket of the Ernisse mechanism is by an actuation of a body release member. The Ernisse mechanism movement is preferably by means of a spring previously wound during the advancing of the film and the cocking or setting of the shutter apparatus.

In the above-identified and related cross reference U.S. Pat. application, Ser. No. 827,550 of Sukeyuki Oki, filed May 26th, 1969, as well as in the present invention the flashlamp retaining socket is initially rotated at least in part by a camming motion initiated by the actuation of release lever. In both the reference application and this invention there is no prior cocking of the shutter and the flashlamp is not ignited until the socket is in motion and has moved a determined distance from its initial position. The shutter is actuated by and during the rotation of the socket and provides therewith a positive synchronization of the flash and exposure.

In the present invention there is no provision for bringing the electrical leads of a flashcube in way of electrical contacts conductively connected to a battery source. Instead, to fire the percussive flashlamp of U.S. Pat. No. 3,508,478, the actuation of the rotation of the flashcube socket by a release lever also causes a striking lever to be moved in timed relation to the socket movement so as to engage the percussive primer of this flashlamp to fire a lamp during and at a determined position in the rotation of the flashlamp.

SUMMARY OF THE INVENTION

The camera mechanism of this invention includes a rotatable socket carried on the top portion of a camera body. This socket is adapted to removably receive a percussively ignited flashlamp which may be a four lamp package or flashcube. Detent or engaging means is provided by the camera mechanism so that the socket can be and is rotated only during an exposure actuation initiated by the movement of a release lever. The socket is rotated from a first "at-rest" position to next "at-rest" position, which difference in "at-rest" positions, in the preferred embodiment, is one-quarter revolution. Intermediate the start and finishing "at-rest" positions of the socket, a striking lever is moved so as to engage and trigger the firing of the percussive primer to cause the lamp to ignite. A biased camming member carried by the camera body is adapted to assist and insure the quarter-turn rotation of the socket. As the socket approaches a point about midway in its rotation from its start to finishing "at-rest" position for one exposure sequence, the camming member provides the propulsive force necessary to move the socket to its finishing position whereat the socket is stopped and latched into a fixed condition until a film in the camera is advanced to a new exposure condition. The film movement causes a release of the latch lock permitting the shutter release lever to be actuated. The rotation of the socket by the release lever also provides means for a protruding pin to engage an extending portion of a pivoted shutter lever so as to swing the shutter lever and uncover the shutter aperture to expose the film. The socket of the camera of this invention is disposed to accept only the base of a percussive photographic flashlamp flashcube as described in U.S. Pat. No. 3,508,478 above-identified, so that when an exterior flash is to be used with a camera having this socket, the rotating of this socket causes a striking lever to be swung so as to engage the percussive firing means of one lamp and cause an illumination to be made in synchronization with a shutter also actuated by the rotating socket base.

It is an object of this invention to provide a camera mechanism wherein a rotatable socket is adapted to removably receive a percussively fired flashlamp and as said socket is rotated a striking lever is swung to engage and trigger the percussive primer to cause an ignition of said flashlamp as it is rotated with and by the socket.

It is a further object of this invention to provide a camera mechanism wherein the rotatable socket additionally has a plurality of slidably mounted pins each disposed to engage and trigger a percussive primer of a flashlamp so that as a flashlamp is rotated by said socket it is brought to a desired firing position whereat a striking lever is caused to engage a pin and move said pin into firing engagement with the percussive primer while at the same time a pin means on the socket engages the shutter arm to swing the shutter and uncover an aperture and cause a synchronized flash-illuminated exposure to be made.

It is still a further object of this invention to provide a camera mechanism wherein the rotatable socket has a plurality of apertures with each aperture disposed to receive the end of an actuating lever and permit the end of the lever to enter and engage the percussive firing mechanism of a flashlamp as the socket is rotated, said socket being retained in a locked non-rotatable condition until the actuating lever is moved to cause an exposure to be made by and during tee rotation of the socket.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid towards this purpose, as it is these that meet the requirement of pointing out the parts, improvements and combinations in which the inventive concepts are found.

There has been chosen a specific embodiment of the striking lever mechanism disposed to ignite the percussive primer of a flashlamp as adopted for use therewith and showing a preferred embodiment of a socket rotating mechanism. This specific embodiment and an alternate embodiment thereof has been chosen for the purposes of illustration and description as shown in the accompanying drawings wherein:

In the following description and in the claims various details will be identified by specific names for convenience; these names, however, are intended to be generic in their application. Corresponding reference characters refer to like members throughout the several figures of the drawings.

The drawings accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT OF FIGS. 1 THROUGH 5

Referring now in particular to the camera mechanism as shown in FIGS. 1 through 4 there is seen a flashlamp socket assembly 20 which in many respects is similar to the socket assembly of the above-referenced U.S. Pat. application Ser. No. 827,650. This socket assembly is particularly adapted to receive only the percussive flashcube above-identified and includes a molded core member 22 rotatably carried in a bearing journal which is contemplated to be formed as a part of the front plate 24. This lower core member includes four equally spaced extending notch members 26, each of which, as shown, is formed with notches 28 disposed to be entered and engaged by a tab portion 30 of a vertically reciprocable release lever 32. The tab 30 when in engagement with notch 28 prevents rotation of the flashlamp socket assembly. When and during the time that release lever 32 is moved downwardly by the operator actuation of a pushbutton 34. the tab 30 is moved from the notch 28 as in FIG. 3 so that as far as stop tab 30 is concerned the socket assembly is in a freely rotatable condition. Formed as extending member portions of the lower core member 22 are wing members 36 which are disposed to be engaged by an advancing lever 38 which is operated in the manner fully described in the reference patent application. Four equally spaced pins 40 are formed on and extend from the bottom surface of core member 22. These pins engage a spring-biased camming member 42 as previously described in the reference application and this camming member 42 assists in the rotation of this flashlamp socket assembly 20 in the manner as it assists the rotation of the flashcube socket of the referenced application. These pins also are disposed to engage and swing shutter 44 to its open condition.

In the present preferred embodiment of FIGS. 1–4 an upper core member 50 is attached to and rotates with the bottom core member. This upper core member has an upper flat surface which is disposed so as to be substantially parallel to the notch portions 26. On the underside of this flat upper surface portion and extending beneath the general plane thereof are four like cam members 52 to be hereinafter more fully described. Molded as a part of and extending upwardly of the flat portion are four arcuate segments 54 each having a bore in which is slidably mounted an actuating pin 56. Each pin has a head end portion 57, and as disposed, the pins are vertically reciprocable within said bores as provided in each of the arcuate segment 50. The head portion 57 providing the bottom end of each pin also establishes the limit of travel of the pin as it slides within a recess 58 formed in the outer wall of the lower core member 22.

Pivotally mounted upon a separate support portion 60 of the front plate 24, and by means of a pivot pin 62, is a trigger lever 64. This trigger lever has an aperture 65 provided in its lower end. Attached to and mounted in this aperture is one end of tension spring 66 whose other end is mounted in an outwardly extending tab member 68 formed on the lower end of release lever 32. A stop tab 70 is provided near the lower end of trigger lever 64. This tab 70 is disposed to engage the side or left edge of front plate 24 so as to limit the counterclockwise rotation of trigger lever 64 around pivot pin 62. The upper right portion of the trigger lever 64 is shaped to provide a rounded driving end 72. This end is movable between the under flat surface of upper core member 50 and lower core member 22. In its upward movement it is disposed to engage the cam portions 52 and is adapted to be cammed downwardly by an inclined ramp 73. The downwardly extending portion of the cam engages the curved end 72 of trigger lever 64 to move the trigger lever clockwise around the pivot pin 62. This engagement of the cam with the lever occurs during rotation of the socket.

Figure 3:
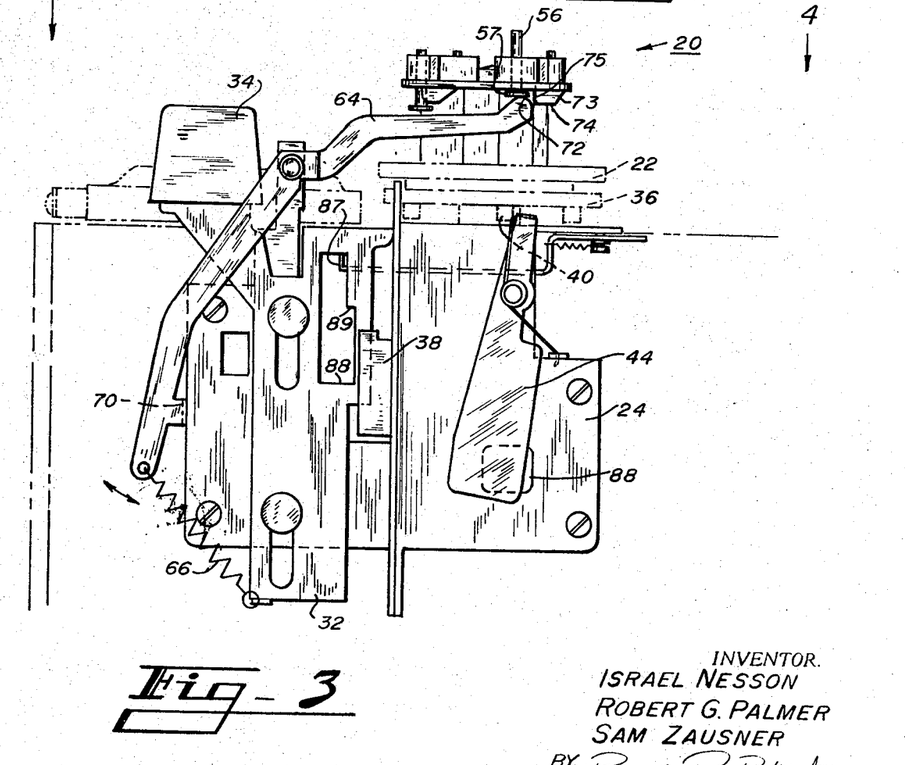
FIG. 3 represents a front view of the camera mechanism of FIG. 1 but with the release member or actuating member moved to its lowermost operating position and showing in particular the striking lever as it engages and moves a pin upwardly in the flashlamp socket.
Figure 4:
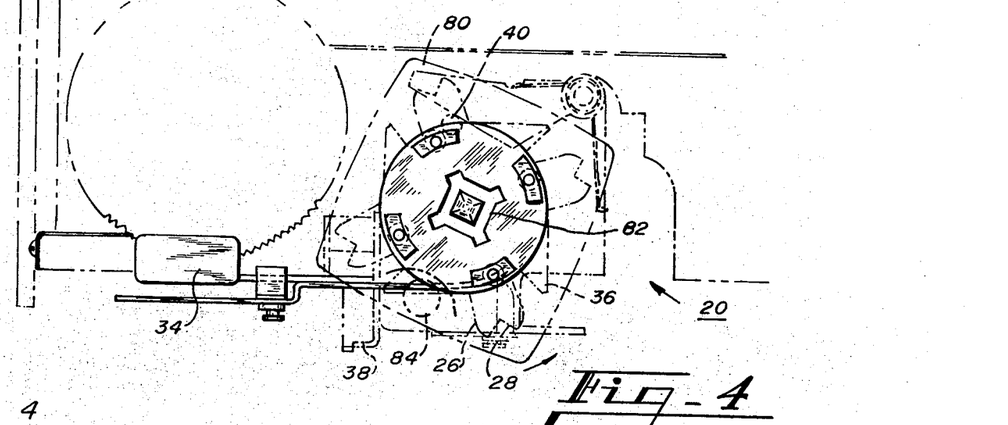
FIG. 4 represents a plan or top view of the mechanism of FIG. 3, the view taken on the line 4—4 and looking in the direction of the arrows and showing the flashlamp socket rotated from the position of FIG. 2 to about the flashlamp firing position and showing the relationship of the striking lever with the socket.

As seen in detail in FIGS. 6A and 6B to the left of the ramp 73 there is a sliding surface 74 which terminates at a vertical wall end 75 whose purpose is hereinafter more fully described. As seen in FIGS. 3 and 4 the release lever 32 has been pushed to its lower extent of travel by the downward manipulation of pushbutton 34 and during this downward movement the socket assembly 20 carrying a flashlamp 80 as shown in phantom outline in FIG. 4 has been moved from the "at-rest" condition of FIG. 2 to a rotated condition as seen in FIG. 4 wherein the lamp is about 25° to 30° from a front "at-rest" condition. With the rotation of the socket assembly 20, the end 72 of trigger lever 64, as seen in FIG. 3, has been brought in way of the inclined surface 73 and onto surface 74 until it reaches the terminating wall end 75. When the end 72 reaches and passes wall end 75 it is snapped upwardly by the tension of spring 66. As the end 72 slides from the surface 74 it strikes the head 57 of pin 56 to drive this pin upwardly until the head 57 engages the undersurface of upper core member 50.

Figure 2:
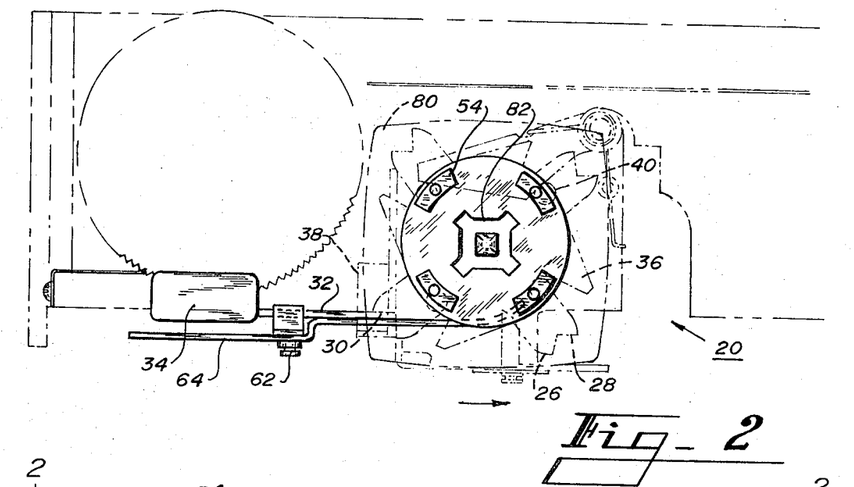
FIG. 2 represents a plan or top view of the camera mechanism of FIG. 1, the view taken on the line 2—2 of FIG. 1 and looking in the direction of the arrows and showing the flashlamp socket in relation to the disposition of the actuating and striking levers.

Referring now in particular to FIGS. 2 and 4 it is to be noted that the percussive flashlamp assembly 80 as described in Brooks, U.S. Pat. No. 3,508,478 is of a flashcube configuration and includes a keyed spindle which is adapted to be received by a socket 82 formed in the socket assembly 20 of this invention. Fingers, not shown, to retain this keyed spindle are provided in this socket and are similar to the fingers as seen in the U.S. Patent application of Oki, above-identified. The keyed spindle causes the mounted flashcube to be oriented so that the four actuating pins 56 are each disposed below a percussive primer striker mechanism which is disposed to be struck to cause a flashlamp to be ignited. Each of the pins 56 lies below and is aligned with an access opening provided in the base of the flashlamp and with the upward movement of the pin 56 into this opening the pin strikes a striker wire carried in the flashlamp base. When struck, the striker wire fires the primer causing the flashlamp to be ignited. As noted above in the discussion of FIG. 4, the flashlamp 80 has been advanced 60° to 65° from its initial "at-rest" condition and at the end 72 of the trigger lever 64 has slid from cam 52 to strike the head 57 of pin 56 to drive this pin into the access opening provided in the base of the flashlamp.

In FIGS. 5A through 5F there is shown in stop-motion sequence the preferred actuation of the flashlamp 80 from an initial "at-rest" condition to the completed quarter-turn and next "atrest" condition. The initial "at-rest" condition is exemplified in FIG. 5A, as shown, the firing pin is about 40° before a line 83 indicating the theoretical midpoint of one-quarter revolution of the flashlamp 80 which is transcribed by the flashlamp during the making of one exposure. This line 83, in this embodiment, also corresponds to a theoretical axis normal to the plane of the film being exposed. A flashlamp unit 84 of flashlamp assembly 80 as shown in phantom outline is about fifty degrees further counterclockwise from the actuating pin 56. The actuating pin 56 lies immediately below and in axial alignment with a striker wire 85 indicated in phantom outline, said striker wire being accessible to the pin through arcuate opening 86 formed in the base of the percussive flashlamp 80.

Figure 1:
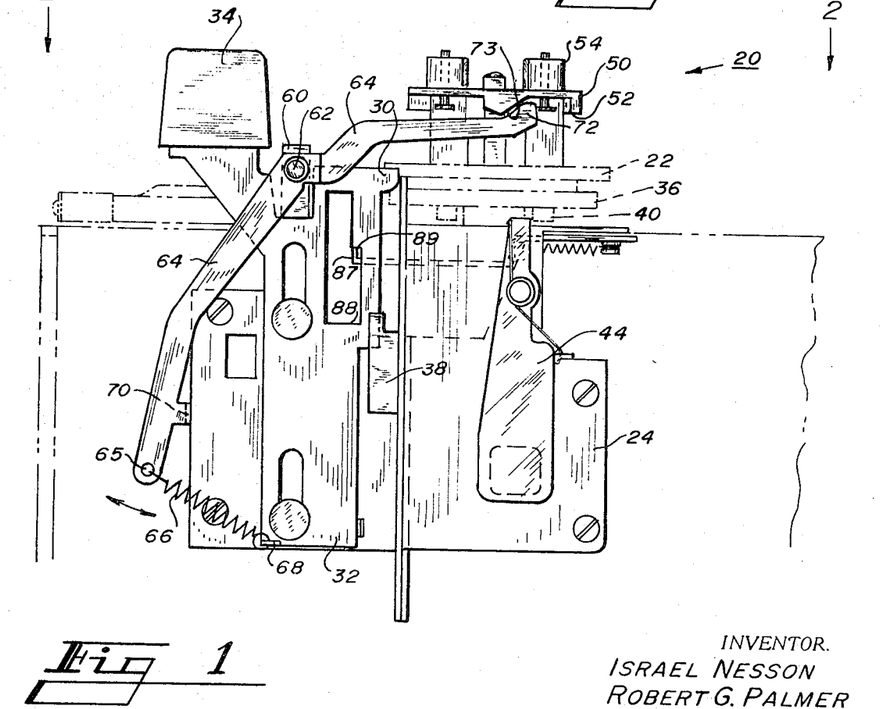
FIG. 1 represents a front view of the preferred camera mechanism of this invention and showing a rotatable flashcube socket and associated actuating mechanism as well as the striking lever in the "at-rest" condition.
Figures 5A, 5B, 5C, 5D, 5E, 5F, 6A, 6B:
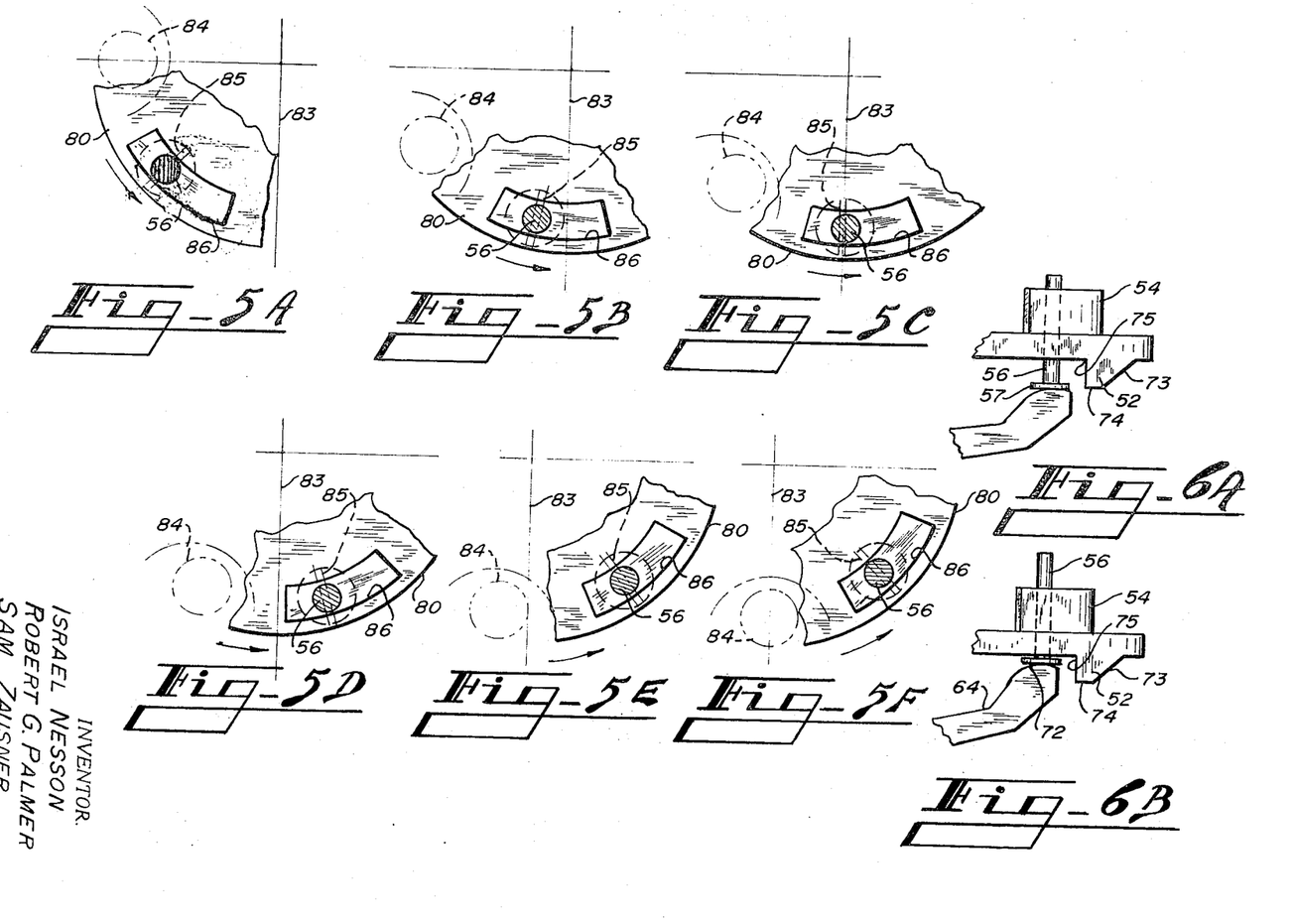
FIGS. 5A, 5B, 5C, 5D, 5E and 5F represent fragmentary plan views of the socket and showing in a stop-motion sequence the movement of a firing primer portion of the socket and actuating pin from a first "at-rest" position to the next "at-rest" position representing 90° of rotation.
FIGS. 6A and 6B represent fragmentary side views of the flashlamp socket and striking lever and showing the upward movement of the primer trigger pin as caused by the upward swing of the end of the striking lever.

In FIG. 5B the flashlamp 80 and the socket holding the flashlamp has been rotated about 33° counterclockwise from the position of FIG. 1. At this position one of the camming pins 40 is engaged by the camming member 42 so that said camming member begins to take over the propulsive rotation of the socket. The remainder of the rotation of the socket and flashcube until they reach the second "at-rest" position is under the influence of this biased camming lever.

In FIG. 5C the flashlamp 84 has been further rotated to a position about 45° counterclockwise from FIG. 1 as indicated by the arrow. At this position the release lever is at the bottom of its stroke as in FIG. 3.

In FIG. 5D the flashlamp 84 has been further rotated to a position about 62° from the starting "at-rest" condition of FIG. 1. One of the pins 40 has just begun to engage the upper end of shutter blade 44 to swing the blade. At this same time the driving end 72 of trigger lever 64 has reached wall end 75 and urged by spring 66 has driven actuating pin 56 from the condition of FIG. 6A to the condition of FIG. 6B. The upper end of pin 56 has entered the access opening 86 and dislodged the striker wire 85 from its cocked condition to cause the percussive primer to fire and ignite the flashlamp unit 84.

In FIG. 5E the now ignited flashlamp has moved about 82° from the initial "at-rest" condition and at this point the shutter has been swung to its maximum extent to uncover the exposure aperture 88 to its fully open condition.

In FIG. 5F the now fired flashlamp unit 84 has reached the second "at-rest" position whereat this flashlamp unit 84 is at the theoretical axis 83 after having moved one-quarter revolution. The driving end 72 of trigger lever 64 has slid from engagement with the head 57 of pin 56 so that the pin has or may be moved downwardly to the limit imposed by recess 58. The lever 64 and cam member 52 are in the adjacent position of FIG. 1 wherein the upper surface of the driving end of the lever is contoured to lay adjacent the inclined ramp 73 of the cam member 52.

The release lever 32 is blocked from unwanted downward movement and double exposure until the film in the camera has been wound to position the next unexposed portion in way of the objective lens. As in the mechanism shown and described in the reference application, a stop member 87 is disposed to extend into the contoured opening 88 provided in release lever 32 and in the blocked condition this stop member engages a shoulder portion 89 to prevent any downward movement of release lever 32. With the film wound to the next unexposed condition, the stop member 87 is displaced leftwardly into the opening 88 whereupon the release lever 32 is unblocked and is free to be moved downwardly as in FIG. 3.

USE AND OPERATION

To use the camera mechanism of this invention it is contemplated that the film has been placed in the camera and wound in the conventional manner so that the stop member 87 has been moved leftwardly from in way of the shoulder portion 89 of the contoured opening 88 formed in the release lever 32. When a flashlamp is necessary or desired to illuminate the picture then the percussive flashlamp assembly 80, as identified in reference U.S. Pat. No. 3,508,476, is mounted in socket assembly 20 with the stem in keyed position in the socket opening 82 and with each striker wire 85 and access opening 86 aligned to accept the upward movement of one of the pins 56. The pins 56 are slidable in the bores formed in the arcuate segments 54 and the flash socket base. When the flashlamp assembly is mounted in the socket assembly 20 it causes the pins to be moved downwardly toward their lower limit as defined by head 57 in the recess 58 whereupon they are at or near the determined lower limit. This lower limit is below the engaging condition necessary to cause the striker wire 85 to be dislodged from its cocked condition to fire the flashlamp. After adjusting the camera to the desired picture taking condition and position, the operator of the camera presses pushbutton 34 downwardly to cause release lever 32 to be moved to the lower extent shown in FIG. 3. As seen in FIGS. 4, 5B and 5C, the camming member 42 has engaged a pin 40 to provide the propulsive force necessary to complete the rotation of the socket to the second "at-rest" position. When the flashlamp and socket reaches the condition of FIG. 5D the driving end 72 of the trigger lever 64 has passed the wall end 75 of the cam member 52 so that said lever slides from the cam and is snapped upwardly by the urging of spring 66 to strike the head 57 of pin 56 and drive the pin upwardly into the position of FIG. 6B.

At this position the upper protruding end of pin 56 has engaged and dislodged striker wire 85 to cause the primer to be fired and the flashlamp 84 to be ignited. This action takes place as the assembly 80 is being rotated and before the assembly has been brought to the second "at-rest" condition. After the assembly has been brought to the "at-rest" condition of FIG. 5F, the curved end 72 of lever 64 has moved to the left of pin 56 so that this pin, as are all the others in the socket assembly, is in a free state as far as its vertical movement within the socket. In either of the "at-rest" conditions all pins 56 may be and are movable to their lower position as limited by the movement of head 57 in the recess 58 formed in the wall of the upper core member 50. The camera mechanism as above-described provides and insures that during a determined portion of time the flashlamp assembly is rotating a pin 40 engages the upper end of shutter 44 causing it to be swung from in way of aperture 88 so that as the flashlamp is fired the shutter is opened at substantially the identical time to provide the desired synchronism whereby the subject to be photographed is also illuminated at that particular time. After the flashlamp is fired another winding of the film must occur before further picture taking proceeds. The above steps are repeated until all four of the flashlamps have been fired whereupon the flashcube is removed from the socket assembly 20 by an upward pull sufficient to release the stem of the flashcube from the receiving socket 82. After removal of the used flashcube a new flashcube or flashlamp assembly 80, if desired, is mounted in socket assembly 20. Thereafter the picture taking proceeds in the normal manner until all of the film has been exposed, after which it is removed and a new one installed in the camera.

ALTERNATE EMBODIMENT OF A CAMERA MECHANISM AS SEEN IN FIGS. 7, 8, 9 AND 10

Referring next to FIGS. 7, 8, 9 and 10 and the flashcube rotating mechanism shown therein, it is to be noted that a socket assembly 100 is substantially like that shown in the reference application of Oki, Ser. No. 827,650; however, an upper core portion is provided with a stem receiving socket 102 which is disposed to receive only the percussively fired flashlamp of Brooks, as described in U.S. Pat. No. 3,508,478. The upper portion of this socket assembly 100 is formed to extend only so far as the inner base diameter of the base of flashlamp assembly 80. This reduced diameter permits the access openings 86 as seen in FIG. 4 to be exposed or uncovered when the flashlamp assembly 80 is mounted in socket assembly 100. This reduced diameter permits the access openings 86 as seen in FIG. 4 to be exposed or uncovered when the flashlamp assembly 80 is mounted in socket assembly 100. This reduced diameter also enables the driving end 104 of a trigger lever 106 to slide or pass up the outer diameter of the socket assembly 100. This driving end 104 is curved to lie adjacent the outer diameter of the socket and has an upstanding end portion disposed to enter the access opening 86 formed in the base of the flashlamp. This opening provides an open passageway to the primer firing striker wire of the flashlamp above-described. This trigger lever 106 is pivotally mounted on an upper end of a plate 108 by means of a pivot pin 110. This plate 108 is attached to a camera body 112 by means of screws 114. Release lever 116 is pushed downwardly by means of a pushbutton 118 and as it moves downwardly a pin 120 carried by the release lever 116 slides down a right face 122 of a tongue portion 123 of lever 106 until said pin reaches a lower diagonal cam portion or surface 124. When pin 120 passes below this diagonal cam portion the trigger lever 106 is free to be rotated counterclockwise around the pivot pin 110.

Figure 8:
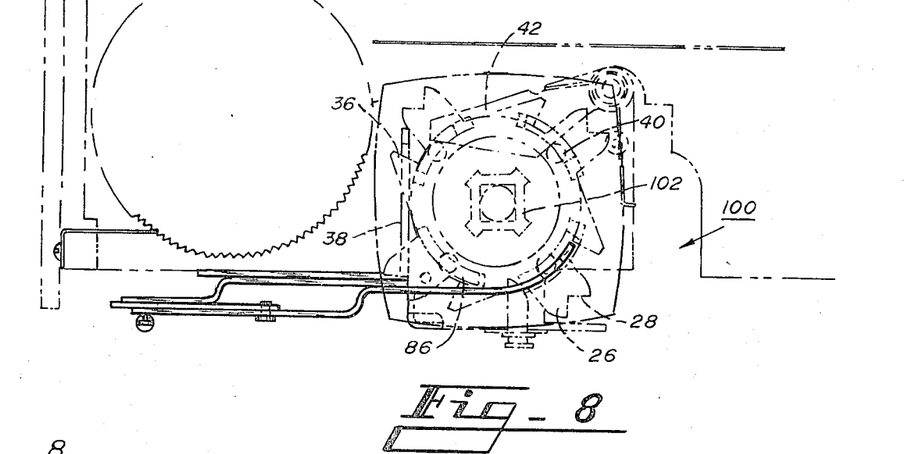
FIG. 8 represents a plan or top view of the camera mechanism of FIG. 7, the view taken on the line 7—7 and looking in the direction of the arrows and showing the socket in its "at-rest" condition and the flashlamp in relation to the striking lever.
Figure 9:
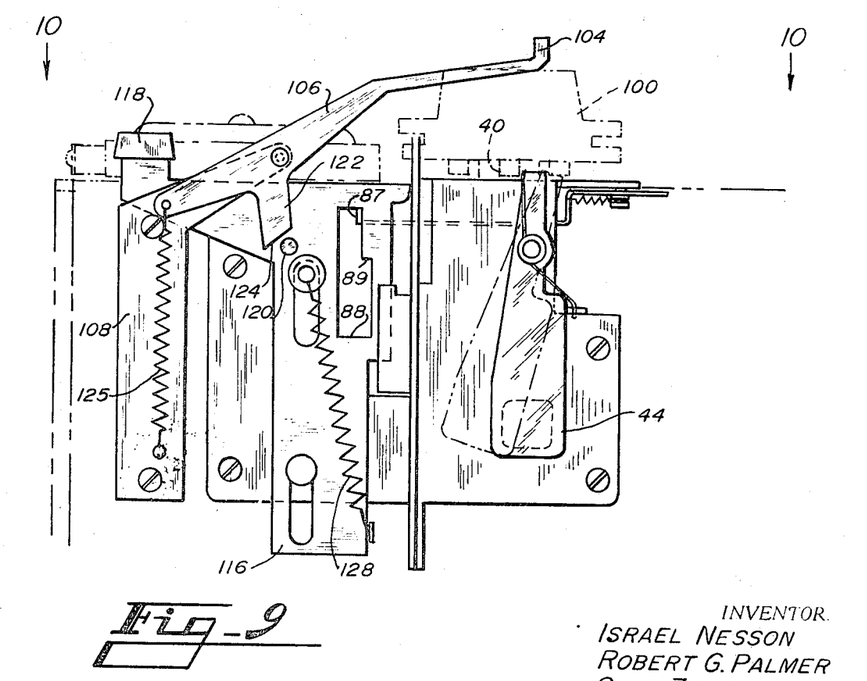
FIG. 9 represents the front view of the camera mechanism of FIG. 7 but with the release member or actuating member moved to its lowermost operating condition and showing in particular the striking lever with its firing end in its uppermost condition.
Figure 10:
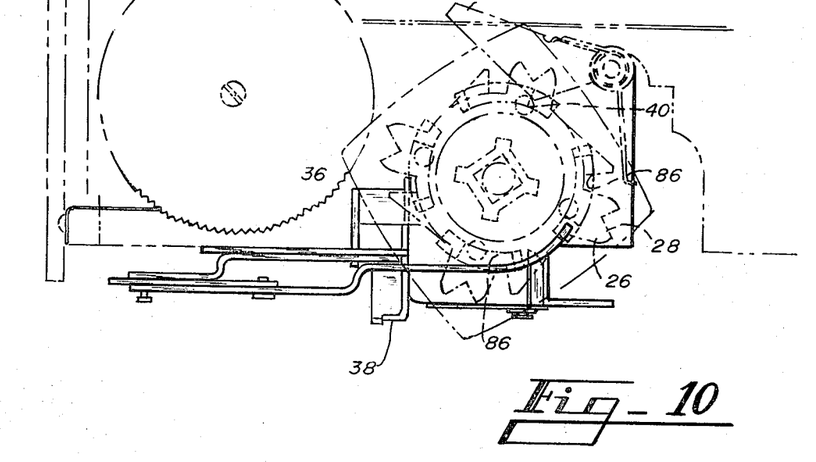
FIG. 10 represents a plan or top view of the camera mechanism of FIG. 9, the view taken on the line 10—10 and looking in the direction of the arrows and showing the flashlamp socket partially rotated from the "at-rest" position of FIG. 8, and FIGS. 11A, 11B, and 11C represent a sequence of three stop motions showing the rotation of the flashlamp and its relation to the striking lever of the mechanism illustrated in FIGS. 7 through 10.

As particularly seen in FIG. 9 a spring 125 has its lower end attached to the fixed plate 108. The upper end of the spring is mounted in an aperture 126 formed in the end of the trigger lever 106. This socket assembly 100, like the socket assembly 20 shown in FIGS. 1 through 4, above-described, also has a lower core member substantially identical to the lower core member 22 above-described. This lower molded core member of the rotatable socket assembly 100 has extending notch members 26 with each notched at 28. Also carried by the assembly are protruding pins 40 disposed to engage camming lever 42 in the manner above-described. As particularly seen in FIG. 8 and FIGS. 11A, 11B and 11C and as in FIGS. 5A through 5F there is provided a curved access opening 86 in the base of the flashlamp. Into this access opening there is mounted a striker wire 85 which is disposed to be actuated to fire a primer when the striker wire has been displaced from its cocked condition.

Figure 7:
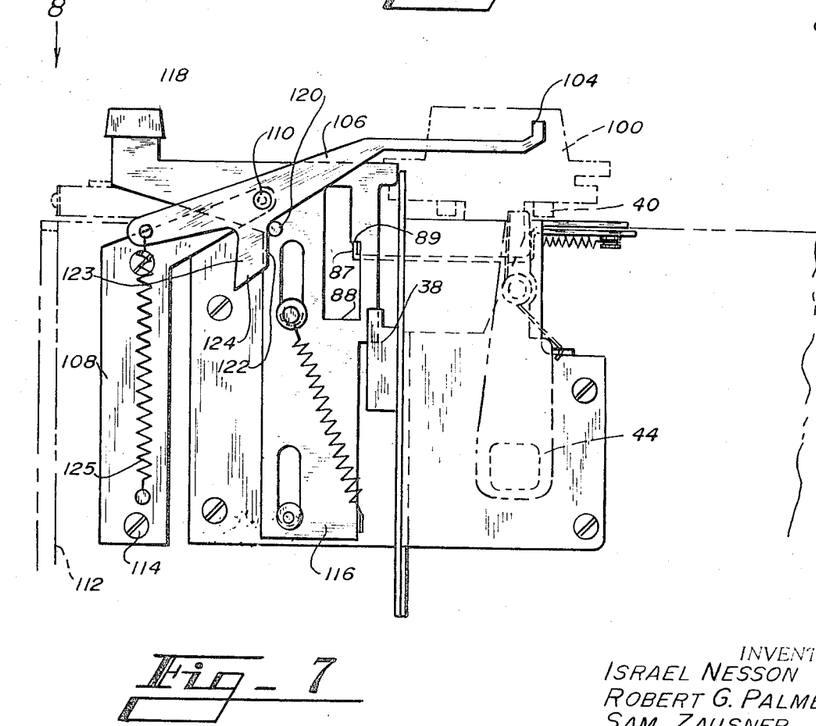
FIG. 7 represents a front view of a camera mechanism similar to that of FIG. 1 but with an alternate striking lever arrangement wherein the end of the striking lever is disposed to enter an aperture in the flashlamp base and actuate a percussive primer of a flashlamp.
Figures 11A, 11B, 11C:
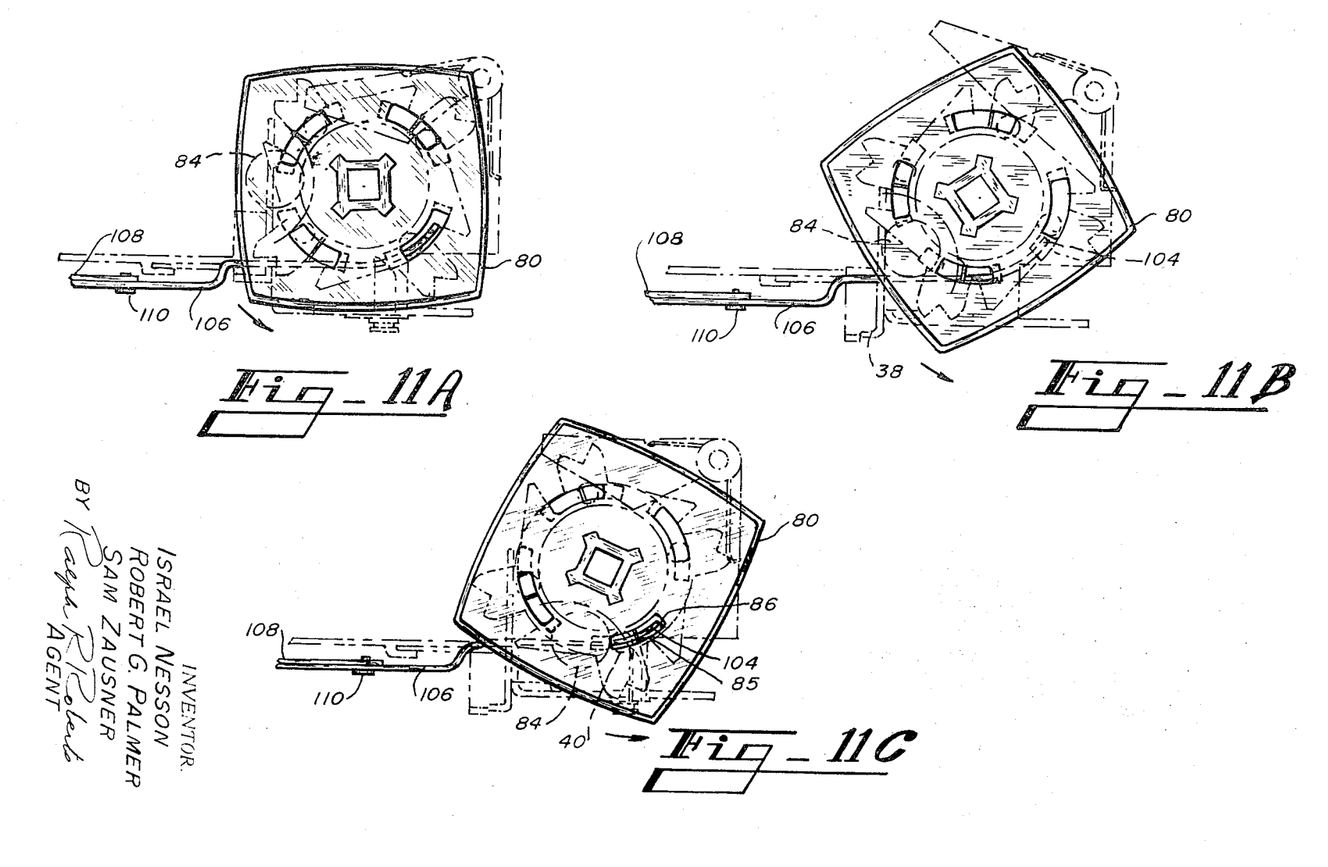

As seen in FIG. 8 and FIG. 11A the flashcube and socket is in its "at-rest" condition and at the same time the release lever 116 is in the "up" condition of FIG. 7. Spring 125 urges trigger lever counterclockwise around pivot pin 110. This rotative motion is limited by pin 120 as it engages the right face 122 of tongue portion 123 of the trigger lever 106. In this position the upward extending driving end 104 of the trigger lever is disposed just below the bottom surface of the base of the flashcube as established by the top surface of the socket assembly 100. In the condition of FIG. 7 the end of the trigger lever is just out of engagement with the flashcube.

As seen in FIG. 9 and FIG. 11B the pushbutton 118 has been pushed downwardly to move release lever 116 to its lowest extent of travel. The socket and flashcube have been rotated until the access opening 86 has been brought in way of the driving end of the trigger lever and the camming pin 120 is now below the face 122 and the lowest diagonal cam 124 of the lever. Spring 125 has urged the driving end 104 of lever 106 into engagement with the undersurface of the base of the rotating flashcube until the access opening 86 is brought in way of the driving end of the lever as in FIG. 11C. When the end 104 of the lever reaches the access opening 86 the lever is snapped upwardly by the spring 25 to enter the opening and engage the striking wire 85 to cause the flashlamp to be ignited. As this occurs, or at the time that this occurs, the upper end of the shutter 44 is engaged by a pin 40 causing the shutter end to be swung from in way of the exposure aperture 88 as seen in phantom outline in FIG. 9. This insures that at the time of the firing of the percussive flashlamp the aperture is uncovered to cause a picture to be taken. The driving end 104 of the lever 106 remains in the arcuate access opening 86 until the flashlamp has substantially reached the end of the quarter revolution and is at the "at-rest" condition. With the release of the release lever 116, spring 128 pulls said release lever upwardly and with it the pin 120 which is moved upwardly. When pin 120 is brought in way of the diagonal camming surface 124 the pin engages the slope to cause the lever 106 to be rotated clockwise to the condition of FIG. 7. With this movement the driving end 104 is moved downwardly and from the access opening in the base of the flashlamp. As the pin reaches and slides on surface 122 of the lever 106 the lever remains in the condition of FIG. 7 whereat the driving end 104 is below the bottom surface of the flashlamp permitting the flashlamp to be rotated.

USE AND OPERATION OF THE ALTERNATE CAMERA MECHANISM

In the alternate mechanism as shown in FIGS. 7 through 11C a percussively fired flashcube having four flashlamps is removably mounted in socket assembly 100 with its stem in the keyed receiving socket so as to maintain the flashcube in a determined precise orientation. In its initial "at-rest" condition, the flashlamp 84 to be fired so as to illuminate the scene being photographed is at a position which is at right angles to the axis of the optical path of the camera. In FIG. 11A the flashcube is in its "at-rest" condition. As the film is wound to bring an unexposed film portion into the optic path of the camera, the stop member 87 is moved from the blocking condition of FIG. 7 to the unblocked condition of FIG. 9. When the operator desires to "take" a picture, the pushbutton 118 is manipulated to move release lever 116 from the "up" position of FIG. 7 to the "down" position of FIG. 9. Advancing lever 38 has engaged and pushed wing member 36 forwardly so as to rotate the socket assembly 100 and the mounted percussive flashlamp assembly 80 to the condition of FIGS. 10 and 11B. Cam pin 120 has been moved downwardly from in way of the right face 122 and diagonal cam 124 so that lever 106 is free to be rotated counterclockwise by spring 125. The driving end 104 of trigger lever 106 has now moved upwardly to engage the underside of the flashcube base 80. The spring 125 urges the end of the lever upwardly and against the bridge portion of the base which extends between access openings 86. The shutter 44 remains in a closed condition until a pin 40 engages the upper end of the shutter as in FIG. 11C. The driving end 104 is positioned so as to enter the access opening 86 and immediately engage a striker wire 85 to cause the primer to fire and the flashlamp to ignite. This ignition occurs about 62° after the initial "at-rest" position and about 18° before the second "at-rest" condition.

After and as a flashlamp ignition begins, the rotating socket continues to advance and rotate the flashcube while pin 40 continues to engage the upper end of the shutter lever to cause it to be swung to an open condition (phantom outline FIG. 9) to permit an exposure to be made. This flash illumination is thus synchronized with the exposure of the picture in a simple and positive manner. It is contemplated that four successive pictures may be taken by successive illuminations provided by the four flashlamps in one flashcube assembly or unit. After these four flashlamps have been fired the flashcube is removed by an upward pull so as to release the stem from the socket 100 whereupon a new flashcube may be reinserted into the same socket.

It is of course realized and contemplated that this camera requires no batteries to actuate the flashlamp since this is a percussive flashlamp. For this reason there is no electrical contacts or conductors for igniting a flashlamp. The flashcube of U.S. Pat. No. 3,508,478 as commercially introduced has its base formed so as to be incompatible with the socket system used with the electrically fired flashcubes. For this reason the socket of this invention is made to accommodate the physical characteristics as supplied by the manufacturer of the percussive flashlamp. The orientation provided by each flashlamp and its firing has been made compatible with the turning and firing of the flashlamp of the reference application. The percussive flashlamp is rotated into a desired relationship with the picture to be taken at the precise time the shutter is being opened for taking of said picture.

In the manner of the above-identified application of S. Oki it has been determined and desired that the flashlamp be fired before it reaches a full forward position so that a portion of a light sweep is provided for the scene being photographed. This occurs at the same time the shutter is actuated which is at a determined position prior to the flashcube having reached its second "at-rest" condition. This concept has been carried forth in the present relationship with the percussive flashcube being fired at a point approximately 18° before reaching its forward or second "at-rest" position. In both the preferred and the alternate trigger lever arrangements above-described the flashcube is fired at a position between 60° and 70° from its initial "at-rest" condition and the firing is completed at a position which is from 5° to 10° before the flashcube reaches its forward or second "at-rest" condition.

The two camera mechanisms as shown in the drawings and above-described have for one of their purposes the redesign of the film advance and flashcube rotating mechanism as disclosed in the S. Oki Pat. application, Ser. No. 827,650 so as to use the percussively fired flashcube of Brooks. In the mechanism of FIGS. 1 through 6B the trigger lever 64 is actuated only as the downward movement of the release lever 32 causes the socket assembly 20 to be rotated. By using the rotation of the socket to regulate all motion of said trigger lever as the lever is moved in response to the cam member contours, the synchronization of the firing of the flashlamp and the shutter opening is both positive and simple.

The alternate embodiment of FIGS. 7 through 11C also provide mechanism in which trigger lever 104 is permitted to enter the access opening 86 to engage striker wire 85 only when the flashcube has been rotated to a determined position. In both the preferred and alternate embodiments the firing of the flashlamp is during the rotation of the flashcube, is independent of the rotative speed of the flashcube, and is in response to a spring-actuated trigger lever which causes the striker wire 85 to be actuated at a selected position in its quarter-turn advancement by the rotating socket.

Terms such as "left," "right," "up," "down," "bottom," "top," "front," "back," "in," "out," "clockwise," "counterclockwise" and the like are applicable to the embodiments shown and described in conjunction with the drawings. These terms are used merely for the purposes of description and do not necessarily apply to the position in which the photographic camera mechanism may be constructed or used.

While a particular embodiment and an alternate embodiment of the flashlamp rotating and firing apparatus for percussively ignited flashlamps has been shown it is to be understood that the invention is not limited thereto since minor modifications may be made which fall within the true scope of the invention.

What is claimed is:

1. A camera mechanism for receiving and rotating a percussively fired flashlamp mounted on a base having spaced access openings disposed to permit entry to a fuse for igniting the flashlamp between determined limits and for a determined segment of rotation, said mechanism including: (a) a flashlamp socket assembly carried by said mechanism and disposed to receive and removably retain a percussively fired flashlamp; (b) means for rotating said socket assembly for a determined segment of rotation; (c) means movable for engaging the socket assembly to prevent rotation of the socket assembly until the film in the camera has been advanced to an unexposed condition in the camera; (d) a trigger means rotatably carried on a pivot provided by the camera mechanism, said trigger means movable on said pivot so that one end of the trigger means is movable toward and away from the flashlamp base; (e) means actuated by the movement of the release means of the camera to cause the end of the trigger means to be moved so as to cause the fuse of the flashlamp to be fired during the rotation of the flashlamp and socket, the ignition of the flashlamp occurring while the flashlamp is rotating and prior to reaching its axial alignment with the optical axis of the camera; (f) a shutter member associated with said socket assembly and adapted to be actuated by and during the rotation of the socket assembly, the shutter movement by the socket assembly being synchronized with the trigger means movement so that the firing of the fuse occurs at about the same time the shutter is being actuated and with the ignition of the flashlamp there is provided an illumination during the time the shutter is actuated to expose the film, and shutter member being pivotally carried on a support means for the mechanism; (g) a spring means disposed to urge the shutter member to a closed condition whereby the actuation of the shutter member is by a swinging movement of the shutter to cause an exposure of the film, and (h) a pin carried by said socket assembly, said this swinging movement being initiated by said pin, said pin during the rotative movement of the socket engaging one end of the shutter member to cause the shutter to swing in opposition to said bias of the spring means.

2. A camera mechanism for rotating a socket assembly as in claim 1 in which the socket assembly has four equally spaced pin members extending downwardly therefrom and in which the shutter member has an arm portion disposed to lie in way of the transcribed path of said pin members as the socket assembly is rotated.

3. A camera mechanism for rotating a socket assembly as in claim 1 in which the trigger means is a lever which is spring-biased so as to be rotated in a first direction and in which there is provided a stop means disposed to limit the extent of movement of the lever in the first direction; and in which there is provided at least one cam member adapted to be brought in way of an end of the trigger lever and to move the lever counterflow to the first direction as the socket is rotated, and adjacent the cam member is an actuating pin slidably mounted in a bore in the socket assembly, the actuating pin positioned and disposed to enter an access opening in the flashlamp when urged thereinto by the end of the trigger lever, said actuation provided by the spring-biased lever after said lever end is deflected from a first position by the sliding engagement of the cam and when and as the cam is moved from in way of the end of the lever the end is snapped inwardly by the spring and engages the actuating pin to push the pin into the access opening and to fire the fuse of the flashlamp.

4. A camera mechanism for rotating a socket assembly as in claim 3 in which the flashlamp is one part of a flashcube having four equally spaced flashlamps, and in which there are four equally spaced cam members and four equally spaced actuating pins each adjacent a cam and in which the socket assembly has guide means disposed to accept keying means on a stem of the flashcube so as to orient the flashcube in the socket so that each access opening is precisely aligned with an actuating pin.

5. A camera mechanism for rotating a socket assembly as in claim 4 in which each cam member is formed with an inclined ramp leading from and extending from the undersurface of an upper core member of the socket assembly, the inclined ramp terminating at a sliding surface which then terminates at a wall end extending to the undersurface of the upper core, the upper end of the trigger lever contoured so as to lay adjacent the inclined ramp and next to a head portion of an actuating pin while the socket assembly is in an "at-rest" condition.

6. A camera mechanism for rotating a socket assembly as in claim 5 in which the actuating pin is carried in a bore which, in part, extends through a segmental portion extending above the upper surface of the upper core member.

7. A camera mechanism for rotating a socket assembly as in claim 6 in which the stop means for limiting the movement of the trigger lever is a stop tab on the lever disposed to engage a fixed portion of the camera mechanism, and in which the head of the actuating pin is circular in configuration and is coaxial with the pin, said head being slidable in a recess formed in an exterior side wall of the socket, one end of the recess providing one limit of movement of the actuating pin while the undersurface of the upper core provides the other limit to the movement of the actuating pin.

8. A camera mechanism for rotating a socket assembly as in claim 7 in which the fuse in the flashlamp is fired by a striker wire displaced from its cocked condition, and in which the displacement of the striker wire is by engagement with the actuating pin, this engagement occurring after the socket and flashcube has rotated more than 60° and less than 75° from its initial "at-rest" condition.

9. A camera mechanism for rotating a socket assembly as in claim 1 in which the trigger means is a lever and in which the flashlamp socket assembly is contoured so the access opening of a flashlamp mounted on the socket assembly is outward of at least the upper portion of the socket and is open for entry thereinto by a driving end of the trigger lever, and in which there is a guide camming pin carried by and on the release means, said pin disposed to cooperatively engage a cam path on the trigger lever and with said cam path in combination with the guide camming pin controlling the movement of the trigger lever so that the driving end portion of the trigger lever is disposed a short distance below the bottom surface of the mounted flashlamp base during the time the release means is in about its upper two-thirds extent of travel, and in the lower one-third of travel of the release means the camming pin releases the trigger lever to the extent that the driving end is movable upwardly to an extent sufficient to enter an access opening in the base of the flashlamp and trigger and fire the fuse to ignite the flashlamp.

10. A camera mechanism for rotating a socket assembly as in claim 9 in which the cam path is a contoured lineal edge surface on the trigger lever and in which the trigger lever is spring-biased so as to be rotated in a first direction so as to urge this cam surface into engagement with the guide camming pin.

11. A camera mechanism for rotating a socket assembly as in claim 10 in which the cam path on the trigger lever is an edge on a face portion of a tongue portion of the lever, and in which the end of the tongue is contoured to provide a diagonal cam surface disposed to be engaged by the guide camming pin and during about the lower one-third movement of the release means the guide camming pin engages the diagonal cam surface so as to limit the upward movement of the end of the trigger lever to a position a little more than that necessary to fire the fuse of the flashlamp, and during the upward lower one-third movement of the release means the camming pin engages the diagonal cam surface to rotate said trigger lever in a direction counter to the first direction and to cause the driving end of the trigger lever to be moved to the determined short distance below the bottom surface of the mounted flashlamp.

12. A camera mechanism for rotating a socket assembly as in claim 11 in which the flashlamp is one of four equally spaced like flashlamps arranged in a flashcube assembly mounted on a common base having a keyed stem extending from said base, and in which there are four equally spaced access openings provided in said base with a bridge surface between said openings in the common base, and in which the socket assembly has guide means disposed to accept the keyed stem so as to orient the flashcube on the socket so that the access openings are precisely spaced with the pins carried by the socket assembly.

13. A camera mechanism for rotating a socket assembly as in claim 12 in which the shutter member is pivotally carried on a support means for the mechanism and in which a spring means urges the shutter to a closed condition, and in which the swinging movement of the shutter to cause an exposure of the film is initiated by one of four equally spaced pins carried by the socket assembly, one of said pins during a quarter-turn rotative movement of the socket necessary for one exposure of the film engaging one end of the shutter member to cause the shutter member to swing in opposition to the bias of the spring means.

14. A camera mechanism for rotating a socket assembly as in claim 13 in which the driving end of the trigger lever is curved so as to lie in an arc next to a reduced diameter top portion of the socket assembly, the driving end positioned in relation to the rotating flashlamp so as to enter the access opening of the flashlamp base after said flashlamp has been rotated at least 60° and not more than 75° from its initial "at-rest" condition.

15. A camera mechanism for rotating a socket assembly as in claim 14 in which the driving end portion of the trigger lever in its upward movement is disengaged from the cooperative action of the cam surface and camming pin during the downward one-third movement of the release means when the driving end portion of the trigger lever is spring-biased into engagement with the undersurface of the rotating flashcube base where it first engages the bridge surface between access openings and then under the influence of the spring-bias enters said access opening to fire the fuse of the flashlamp.

16. A camera mechanism for rotating a socket assembly as in claim 1 in which the release means is a lever member slidable on a front plate support portion of the camera.

* * * * *

PO-1050
(5/69)

UNITED STATES PATENT OFFICE
CERTIFICATE OF CORRECTION

Patent No. 3,657,980            Dated April 25th, 1972

Inventor(s) Israel Nesson, Robert G. Palmer, Sam Zausner

It is certified that error appears in the above-identified patent and that said Letters Patent are hereby corrected as shown below:

Column 1, line 41, change "No" to read -- is --;

1, line 56, change "827,550" to read -- 827,650 --;

1, line 59, insert -- a -- between "of" and "release".

Column 2, line 64, change "tee" to read -- the --.

Column 5, line 46, change "atrest" to read -- "at rest" --.

Column 10, line 56, delete "this".

Signed and sealed this 19th day of September 1972.

(SEAL)
Attest:

EDWARD M. FLETCHER, JR.           ROBERT GOTTSCHALK
Attesting Officer                 Commissioner of Patents